United States Patent
Xin et al.

(10) Patent No.: US 8,477,774 B2
(45) Date of Patent: Jul. 2, 2013

(54) METHOD AND SYSTEM FOR DETECTING ACCESSING HOST CONTAINED IN NETWORK, AND STATISTIC AND ANALYZING SERVER

(75) Inventors: Yang Xin, Shenzhen (CN); Lifeng Liu, Shenzhen (CN); Zhibin Zheng, Shenzhen (CN); Hongliang Zhu, Shenzhen (CN); Kai Zhao, Shenzhen (CN); Yixian Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 946 days.

(21) Appl. No.: 12/569,459

(22) Filed: Sep. 29, 2009

(65) Prior Publication Data

US 2010/0017376 A1    Jan. 21, 2010

Related U.S. Application Data

(63) Continuation of application No. PCT/CN2008/070400, filed on Mar. 4, 2008.

(30) Foreign Application Priority Data

Mar. 30, 2007  (CN) .......................... 2007 1 0096203

(51) Int. Cl.
   *H04L 12/28* (2006.01)
(52) U.S. Cl.
   USPC .......................................... 370/389; 370/392
(58) Field of Classification Search
   CPC . H04L 12/2697; H04L 29/12339; H04L 43/18; H04L 43/50; H04L 61/2503
   See application file for complete search history.

(56) References Cited

U.S. PATENT DOCUMENTS 6,711,164 B1 *   3/2004   Le et al. .................... 370/392
2007/0070916 A1 *   3/2007   Lehane et al. ................. 370/252

FOREIGN PATENT DOCUMENTS

CN     1866951 A    11/2006
CN     1878096 A    12/2006

(Continued)

OTHER PUBLICATIONS

International Search Report from P.R. China in International Application No. PCT/CN2008/070400 mailed Jun. 12, 2008.

(Continued)

*Primary Examiner* — Jung Park
(74) *Attorney, Agent, or Firm* — Brinks Hofer Gilson & Lione (57) ABSTRACT

A detecting method is provided, which includes extracting an Internet Protocol Identifier value from an obtained data packet. The detecting method may further include searching in a record table containing a correspondence relationship between an Internet Protocol Identifier value and a terminal serial number to determine whether the record table contains an adjacent Internet Protocol Identifier value smaller than the extracted Internet Protocol Identifier value and modifying the adjacent Internet Protocol Identifier value that is smaller than the extracted Internet Protocol Identifier value to be the extracted Internet Protocol Identifier value if the record table contains the adjacent Internet Protocol Identifier value smaller than the extracted Internet Protocol Identifier value. Otherwise, the detecting method may also include, adding a new record of the extracted Internet Protocol Identifier value and the corresponding terminal serial number into the record table. When a notification is received, the detecting method may calculate the number of terminal serial numbers in the record table and output the number of terminal serial numbers as the number of hosts. The provided detecting method may further provide a corresponding statistic and analyzing server and a detecting system.

12 Claims, 7 Drawing Sheets

FOREIGN PATENT DOCUMENTS

| | | |
|---|---|---|
| CN | 101026630 A | 8/2007 |
| JP | 2002-232445 | 8/2002 |
| KR | 2005-0045219 A | 5/2005 |
| WO | WO 2007/129301 A2 | 11/2007 |

OTHER PUBLICATIONS

Bellovin, "A Technique for Counting NATted Hosts", IMW, ISBN: 1-58113-603-X, pp. 267-272, (Nov. 6-8, 2002).

Written Opinion of the International Searching Authority (translation) dated (mailed) Jun. 12, 2008, issued in related Application No. PCT/CN2008/070400, filed Mar. 4, 2008, Huawei Technologies Co., Ltd. (6 pages).

European Extended Search Report dated (mailed) Oct. 6, 2010, for Application No. 08715136.1-1525, Huawei Technologies Co., Ltd. (11 pages).

Tadayoshi Kohno et al., Remote physical device fingerprinting, IEEE The Computer Society, 2005, (16 pages).

Steven M. Bellovin, XP-002602145, A Technique for Counting NATted Hosts, AT&T Labs Research, (pp. 267-272), Nov. 2002.

K. Egevang et al., The IP Network Address Tanslator (NAT), Network Working Group, Request for Comments: 1631, Category: Information, May 1994, (pp. 1-10).

Internet Protocol, Darpa Internet Program, Protocol Specification, rfc791.txt, by Information Sciences Institute University of Southern California 4676 Admiralty Way, Marina del Rey, California 90291, Sep. 1981, (46 pages).

\* cited by examiner

METHOD AND SYSTEM FOR DETECTING ACCESSING HOST CONTAINED IN NETWORK, AND STATISTIC AND ANALYZING SERVER

CROSS REFERENCE TO RELATED APPLICATIONS

This application is a continuation of International Patent Application No. PCT/CN2008/070400 filed Mar. 4, 2008, which claims priority to Chinese Patent Application No. 200710096203.5, filed Mar. 30, 2007, both of which are incorporated herein by reference in their entirety.

TECHNICAL FIELD

The present disclosure relates to the field of network information technologies, and in particular to a method and system for detecting an accessing host, and a statistic and analyzing server.

BACKGROUND

In Internet technologies, in order to solve the problem of scarce global Internet Protocol (IP) address resources, the Internet Engineering Task Force (IETF) has proposed the Network Address Translation (NAT) technology. Each host in a Local Area Network possesses its own private IP address, and the NAT device possesses one or more public IP addresses. Each host can map its private IP address and port number into a public IP address and port number, thus to realize accessing the Internet in a shared way.

Practically, for a supervisory purpose, it is often required to detect the number of access sharing hosts. An existing detecting method is to detect the number of access sharing hosts based on the Internet Protocol Identifier (IPID). The IPID field is a 16-bit identification field in the header of an IP data packet, and can uniquely identify each data packet sent by the host. Each host initializes the IPID when initializing the TCP/IP (Transport Control Protocol/User Datagram Protocol) protocol stack during booting. Taking the WINNT system as an example, the initialized IPID value is 0, and thereafter the IPID value (16 bits) is incremented by 1 (in binary) at each time the host sends a data packet. Because it is unlikely that every host is powered on at the same time and because each host operates differently, it is highly unlikely for the hosts in the same network segment of the Local Area Network to generate an identical IPID value. In addition, when the data packet traverses the NAT device, the NAT device typically does not modify the IPID value of the private network. Thus, data packets sent by different hosts can be distinguished from each other.

According to the detecting method of the prior art, data streams sent from hosts are categorized by distinguishing each category using the IPID value, and data streams belonging to the same host are collected together to vary in an IPID value. The IPID value corresponding to the stream and the survival duration of the IPID value are updated with the variation of the IPID value of the stream. The detecting device records the IPID value of the received data packet. For example, the IPID value of a previously received data packet is 2000 and the IPID value of a subsequently received data packet is 2005. If it is assumed that the threshold range is 20, data packets corresponding to the IPID value having a difference of 20 from the IPID value 2000 are all considered as data streams sent from the same host, and then the originally recorded IPID value 2000 corresponding to such a host is updated as 2005. This applies similarly to other scenarios. By performing statistics for all the existing IPID values over a period of time, the number of existing IPID values is considered as the number of access sharing hosts.

However, in the detecting method of the prior art, the detection accuracy is not satisfactory, because the detected number of hosts is closely related to the collection of the data stream sent from each host. Once a new data stream is collected in error, a mistaken determination may occur. When the IPID values of two hosts are close to each other and the variation extent thereof is similar to each other within a period of time, a missing determination may easily arise. When there is heavy stream traffic in the detected network segment and the IPID value of the data packet sent from the same host vary greatly, a redundant determination may easily arise. Furthermore, if the stream traffic from the host is too heavy, e.g. during a Peer-to-Peer (P2P) downloading, there is a heavy burden on the collection of the streams.

SUMMARY

The disclosed embodiments provide a method and system for detecting a host contained in a network and a statistic and analyzing server, and can improve the accuracy of detecting the number of access sharing hosts.

Consistent with some embodiments, a method for detecting a host in a network is provided. The method may include:

extracting an Internet Protocol Identifier (IPID) value IPID1 from an obtained data packet;

searching in a record table containing a correspondence relationship between an Internet Protocol Identifier value and a terminal serial number to determine whether the record table contains an adjacent Internet Protocol Identifier value IPID2 smaller than the extracted IPID1, modifying the adjacent Internet Protocol Identifier value IPID2 as the IPID1 if the record table contains the adjacent Internet Protocol Identifier value IPID2 smaller than the extracted IPID1, and adding a new record of the IPID1 and the corresponding terminal serial number into the record table otherwise; and calculating the number of terminal serial numbers in the record table and outputting the number of terminal serial numbers as the number of hosts.

Consistent with another embodiment, a statistic and analyzing server is provided. The statistic and analyzing server may include:

a table storing unit, configured to store a record table containing a correspondence relationship between an Internet Protocol Identifier (IPID) value and a terminal serial number;

a first searching unit, configured to search in the record table stored in the table storing unit to determine whether the record table contains an adjacent Internet Protocol Identifier value smaller than an Internet Protocol Identifier value IPID1 extracted from an obtained data packet;

a first processing unit, configured to modify the adjacent Internet Protocol Identifier value smaller than the extracted Internet Protocol Identifier value IPID1 as the IPID1 if the first searching unit determines that the record table contains the adjacent Internet Protocol Identifier value smaller than the IPID1, and to add a new record of the IPID1 and the corresponding terminal serial number into the record table if the first searching unit determines that the record table contains no adjacent Internet Protocol Identifier value smaller than the IPID1; and a statistic unit, configured to calculate the number of terminal serial numbers in the record table and to output the number of terminal serial numbers as the number of hosts.

Consistent with another embodiment, a detecting system is provided. The detecting system may include:

a separating and filtering server, configured to separate a data packet of a designated type from the received data packet, and to extract an Internet Protocol Identifier value (IPID) IPID4 from the separated data packet; and a statistic and analyzing server, configured to search in a record table containing a correspondence relationship between an Internet Protocol Identifier value and a terminal serial number to determine whether the record table contains an adjacent Internet Protocol Identifier value smaller than the IPID4, to modify the adjacent Internet Protocol Identifier value smaller than the IPID4 as the IPID4 if so, to add a new record of the IPID4 and the corresponding terminal serial number into the record table otherwise, and to calculate the number of terminal serial numbers in the record table and to output the number of terminal serial numbers as the number of hosts.

The disclosed embodiments may include extracting an Internet Protocol Identifier value from an obtained data packet; searching in a record table containing a correspondence relationship between the Internet Protocol Identifier value and a terminal serial number to determine whether the record table contains an adjacent Internet Protocol Identifier value smaller than the extracted Internet Protocol Identifier value, modifying the adjacent Internet Protocol Identifier value smaller than the extracted Internet Protocol Identifier value as the extracted Internet Protocol Identifier value if so, and adding a new record of the extracted Internet Protocol Identifier value and the corresponding terminal serial number into the record table otherwise; and calculating the number of terminal serial numbers in the record table and outputting the same as the number of hosts. Because some embodiments may make use of the variation rule of the Internet Protocol Identifier value, the hosts can be sequentially separated out with the descending Internet Protocol Identifier values according to an algorithm similar to, but not limited to, the Bubble-Sort. Thus, the number of access sharing hosts may be determined more accurately.

DETAILED DESCRIPTION

Consistent with some embodiments, a host record table is stored in a detecting system, with each source IP address corresponding to a host record table. The host record table may include at least the following: a host serial number and a latest updated IPID value. If a new IPID (denoted as IPIDcur) is received, the corresponding host record table is found according to the source IP address, in which table the maximum value among the IPID records smaller than the IPIDcur is searched for. If the maximum value is found, it is updated; otherwise (i.e. the IPIDcur is the minimum one), a new host record is created directly, i.e. the IPIDcur is stored and a new host serial number is allocated to indicate a new host. As can be seen from the above process, if the host serial numbers are numbered sequentially from 1 to n, after the host serial numbers become substantially stable, the IPID of the host having the serial number 1 is the maximum one, the IPID of the host having the serial number 2 is next to the maximum one, and the IPID of the host having the serial number n is the minimum one (except for the case of inversion). Put another way, after the serial number of the host having the maximum IPID value is determined. Once the host having a relatively smaller IPID value operates, it is found smaller than that of the existing host, and thus a new host serial number can be created. This process may be similarly applied to the other hosts until all the hosts behind the NAT are determined one by one. Therefore, the disclosed embodiment may make full use of the variation rule of the Internet Protocol Identifier value. The hosts can be sequentially separated out with the descending Internet Protocol Identifier values according to an algorithm similar to the Bubble-Sort, and thus the number of access sharing hosts can be determined more accurately.

Figure 1:
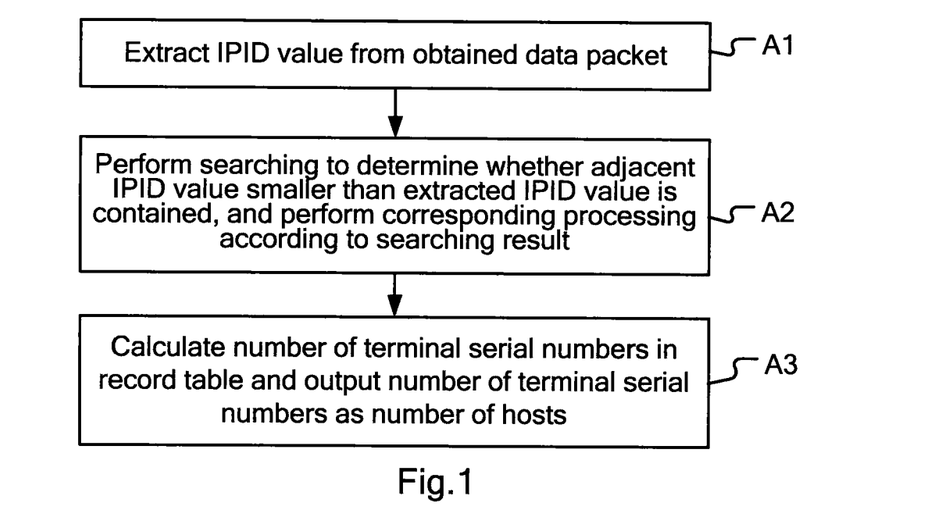
FIG. 1 is a flow chart illustrating a detecting method according to a first embodiment.

FIG. 1 is a flow chart illustrating a detecting method consistent with a first embodiment. Specific process may include:

A1. Extracting an IPID value from an obtained data packet.

A2. Searching to determine whether an adjacent IPID value smaller than the extracted IPID value is contained, and performing corresponding processing according to the searching result.

Searching in a record table containing a correspondence relationship between the IPID value and the terminal serial number to determine whether the record table contains an adjacent IPID value smaller than the extracted IPID value, to update the adjacent IPID value smaller than the extracted IPID value as the extracted IPID value if so, and to add a new record of the extracted IPID value and the corresponding terminal serial number into the record table otherwise.

A3. Calculating the number of terminal serial numbers in the record table and outputting the number of terminal serial numbers as the number of hosts.

When a notification is received, the number of terminal serial numbers in the record table, i.e. the number of access sharing hosts, is calculated and output. The content of the notification may be a request for calculating the number of terminal serial numbers in the record table within a preset period of time, but is not limited thereto.

An exemplary implementation of some of the disclosed embodiments is described herein below in connection with practical application scenarios.

Figure 2:
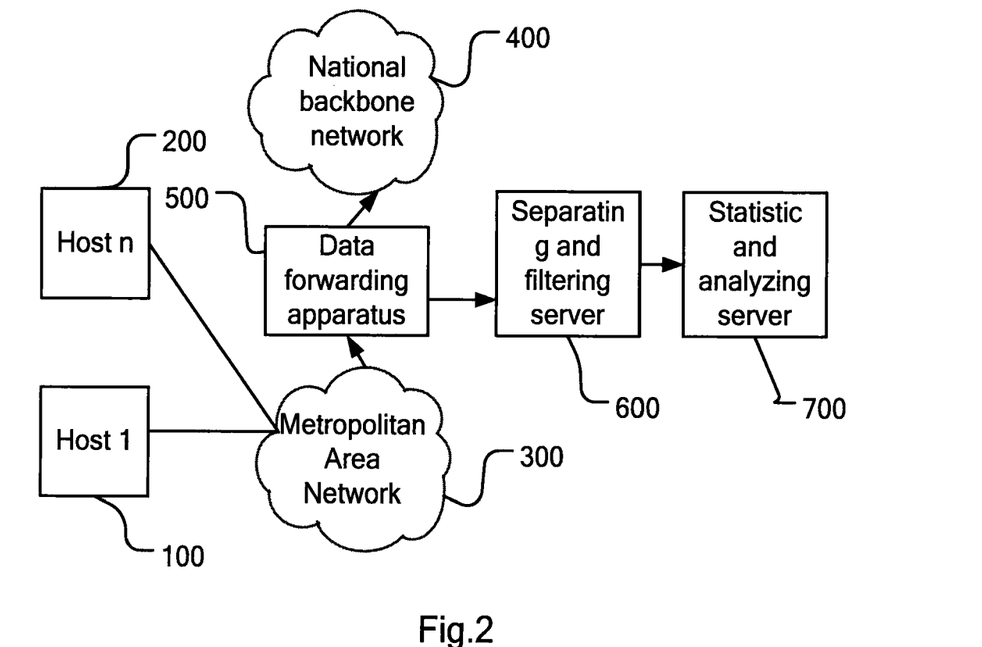
FIG. 2 is a schematic diagram illustrating an application scenario consistent with some embodiments.

For example, some embodiments may be applied in an access sharing detecting system, and can also act as a component of a network monitoring system. FIG. 2 is a schematic diagram illustrating an application scenario consistent with some embodiments. In FIG. 2, 100 represents a host 1, 200 represents a host n, 300 represents a Metropolitan Area Network, 400 represents a national backbone network, 500 represents a data forwarding apparatus, 600 represents a separating and filtering server communicating with the data forwarding apparatus 500, and 700 represents a statistic and analyzing server communicating with the separating and filtering server.

The data forwarding apparatus 500 is configured to obtain network data accessing the network from the exit of the monitored group of hosts or the exit of the network, and to acquire and transfer the network data to the separating and filtering server 600 by using an independent broadband. The data forwarding apparatus 500 may be an optical splitter being arranged between the interface of the Metropolitan Area Network and the interface of the backbone network. The optical splitter is an existing network device being configured to import data of one network into another branch network. The data forwarding apparatus 500 may alternatively be a mirror component for data mirroring in a switch supporting port data mirroring. A backup of the network data accessing the network via the exit can be obtained by using the mirror component.

The separating and filtering server 600 is configured to separate a data packet of a designated type from the network data transferred from the data forwarding apparatus, to extract useful data from the separated data packet, to report the data to the statistic and analyzing server 700, and to discard the data which is not of the designated type. Here, the data packet of the designated type may be the IP data packet, including the TCP data packet and the UDP data packet. The extracted useful data may include the IPID filed, the Five-Tuple and other feature fields.

The statistic and analyzing server 700 is configured with a detection algorithm. The statistic and analyzing server 700 is configured to analyze and perform statistics for the data output from the separating and filtering server 600, and to provide information on the number of access sharing hosts. The separating and filtering server 600 and the statistic and analyzing server 700 may be the same server, or alternatively may be servers independent from each other.

The detecting method consistent with some embodiments may include two parts, i.e. statistics and reporting. The statistic method may include performing statistics for the variation rule of the IPID during a certain period of time and carrying out corresponding processing. The reporting algorithm may be time-triggered, which includes obtaining the number of hosts behind the NAT according to the statistic result of the IPID over such a period of time when it is time for reporting. Some embodiments describe the detecting method by taking the variation rule of the IPID in the WINNT system as an example, but is not limited thereto.

Figure 3:
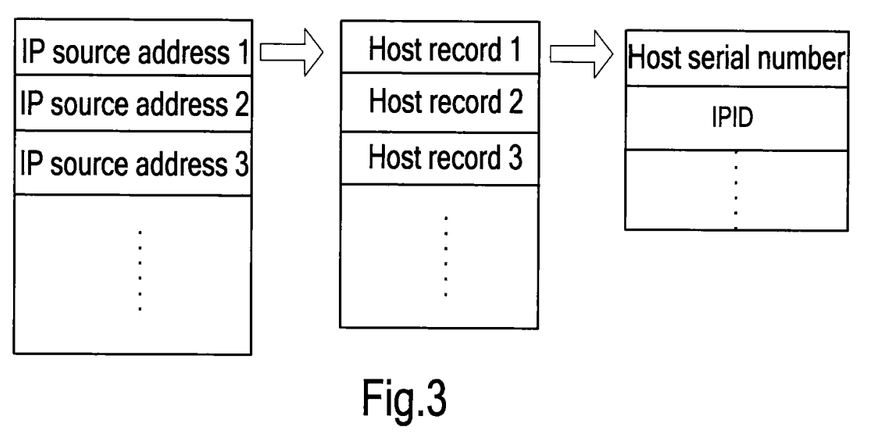
FIG. 3 is a structural diagram illustrating a storing table contained in a statistic and analyzing server according to some embodiments.

FIG. 3 is a structural diagram illustrating a storing table contained in a statistic and analyzing server consistent with some embodiments. The statistic and analyzing server may store a table to record relevant statistic information. Specifically, each IP is related to a monitored device that may be an access sharing host NAT or a common host, and is extracted from the source address of the data packet for matching. If the IP relates to the access sharing NAT, the number of host records may be larger than 1, and each host record actually corresponds to a detected host behind the NAT. The host record at least includes the host serial number and the latest updated IPID value, and may include other auxiliary information, e.g. the Hash value of the Five-Tuple, the number of received data packets, the update time, and the like.

Figure 4:
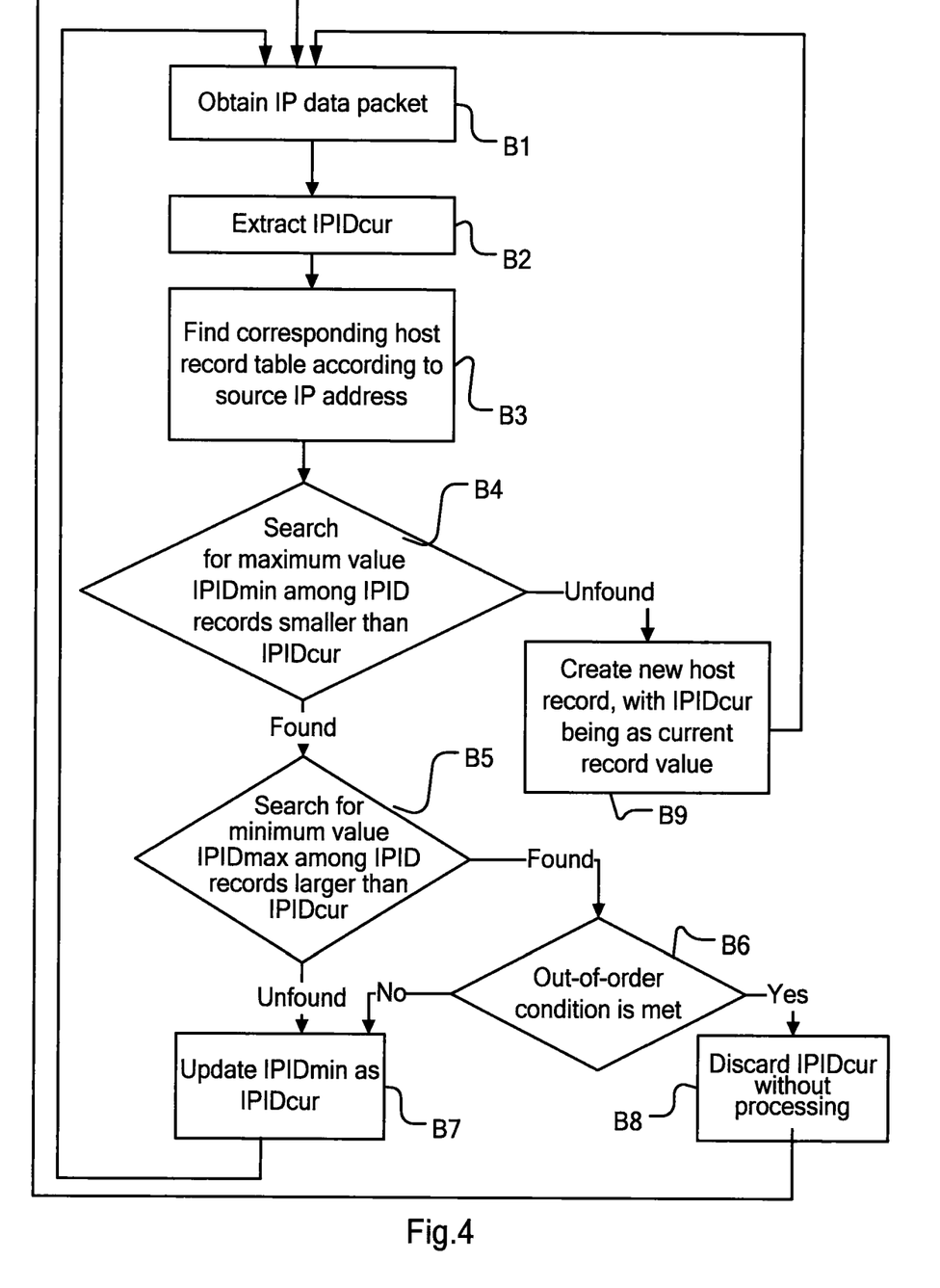
FIG. 4 is a flow chart illustrating statistics of the detecting method according to a second embodiment.

FIG. 4 is a flow chart illustrating statistics of the detecting method consistent with a second embodiment. The method may include the following steps:

B1. The data forwarding apparatus receives an IP data packet of the monitored network, and forwards it to the separating and filtering server.

B2. The separating and filtering server extracts the IPID field (denoted as IPIDcur) out and transfers it to the statistic and analyzing server.

B3. The statistic and analyzing server finds the corresponding host record table according to the source IP address.

Here, the host record table may be a series of Two-Tuple (host serial number, IPID).

B4. Search in the host record table to determine whether the host record table contains a maximum value IPIDmin among the IPID records smaller than the IPIDcur, execute step B5 if so, and execute step B9 otherwise.

B5. Search in the host record table to determine whether the host record table contains the minimum value IPIDmax among the IPID records larger than the IPIDcur, execute step B7 if not, and execute step B6 otherwise.

B6. Determine whether the out-of-order condition is met, execute step B8 if so, and execute step B7 otherwise.

Due to reasons such as network congestion, routing selection and the like, the data packet having a relatively larger IPID may arrive earlier, and the data packet sent from the same host and having a relatively smaller IPID may arrive later. This is called out-of-order. In this step, whether the received IPIDcur meets the out-of-order condition may be determined. The determination for the out-of-order condition may use a threshold method, i.e. occurrence of out-of-order may be determined if the difference between the IPIDcur and the adjacent IPID in the records which is larger than the IPIDcur is within a certain range.

B7. Update the maximum value IPIDmin among the IPID records smaller than the IPIDcur as the IPIDcur.

B8. Discard the IPIDcur.

The out-of-order condition is met, and the IPIDcur is discarded without being processed.

B9. Create a new record in the host record table.

It is assumed that originally there are m IPID records, and at this time, a new record (m+1, IPIDcur) is created in the host record table.

It should be noted that in some embodiments, to firstly determine by searching whether the maximum value IPIDmin among the IPID records smaller than the IPIDcur is contained, and then to determine by searching whether the minimum value IPIDmax among the IPID records larger than the IPIDcur is contained may be performed as an example, but the present disclosure is not limited thereto. The two steps are not necessarily one after another. Alternatively, the searching may be executed simultaneously to each other, and corresponding processing may be performed according to the searching result.

Figure 5:
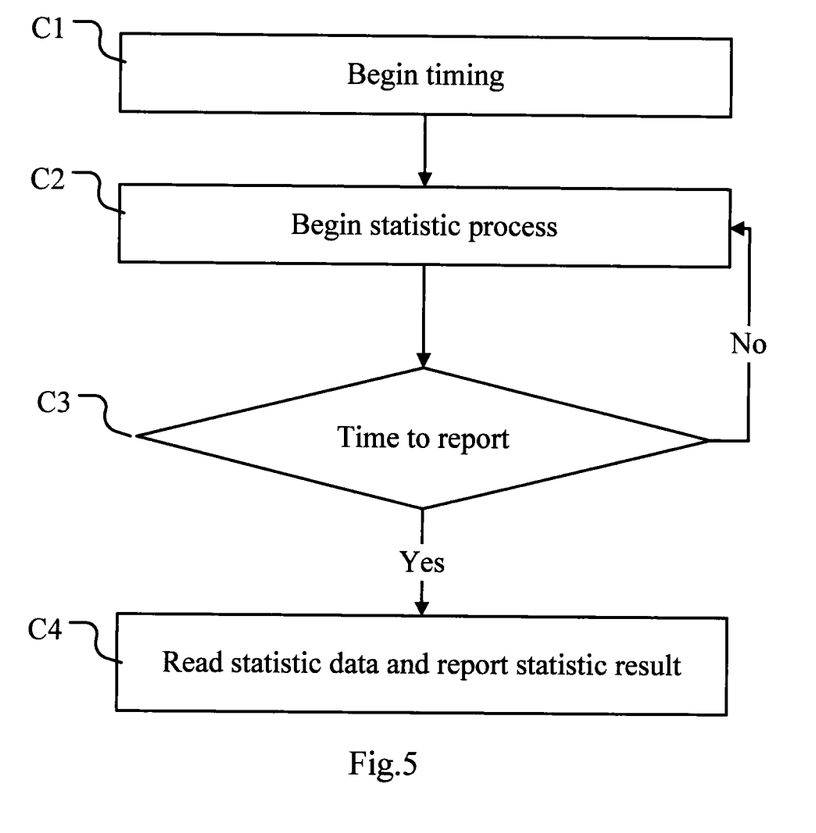
FIG. 5 is a flow chart illustrating reporting of the detecting method according to the second embodiment.

FIG. 5 is a flow chart illustrating reporting of the detecting method consistent with the second embodiment. The method may include the following steps.

C1. Start a timer to begin timing.

C2. Begin statistic process.

C3. Determine whether it is time to report, return to step C2 to perform statistics if it is not time to report, and execute step C4 otherwise.

C4. It is time to report according to the timer, and the statistic and analyzing server reads the host record table and reports the number of host records (or the number of host serial numbers) meeting a condition as the number of access sharing hosts behind the NAT.

It should be noted that the reporting mechanism may adopt a packet-triggered mechanism (i.e. after a certain period of time, only if update is performed upon reception of a particular data packet, can the record be reported) instead of the time-triggered mechanism. Furthermore, the stream aging mechanism may also be used to further improve the accuracy.

Figure 6A:
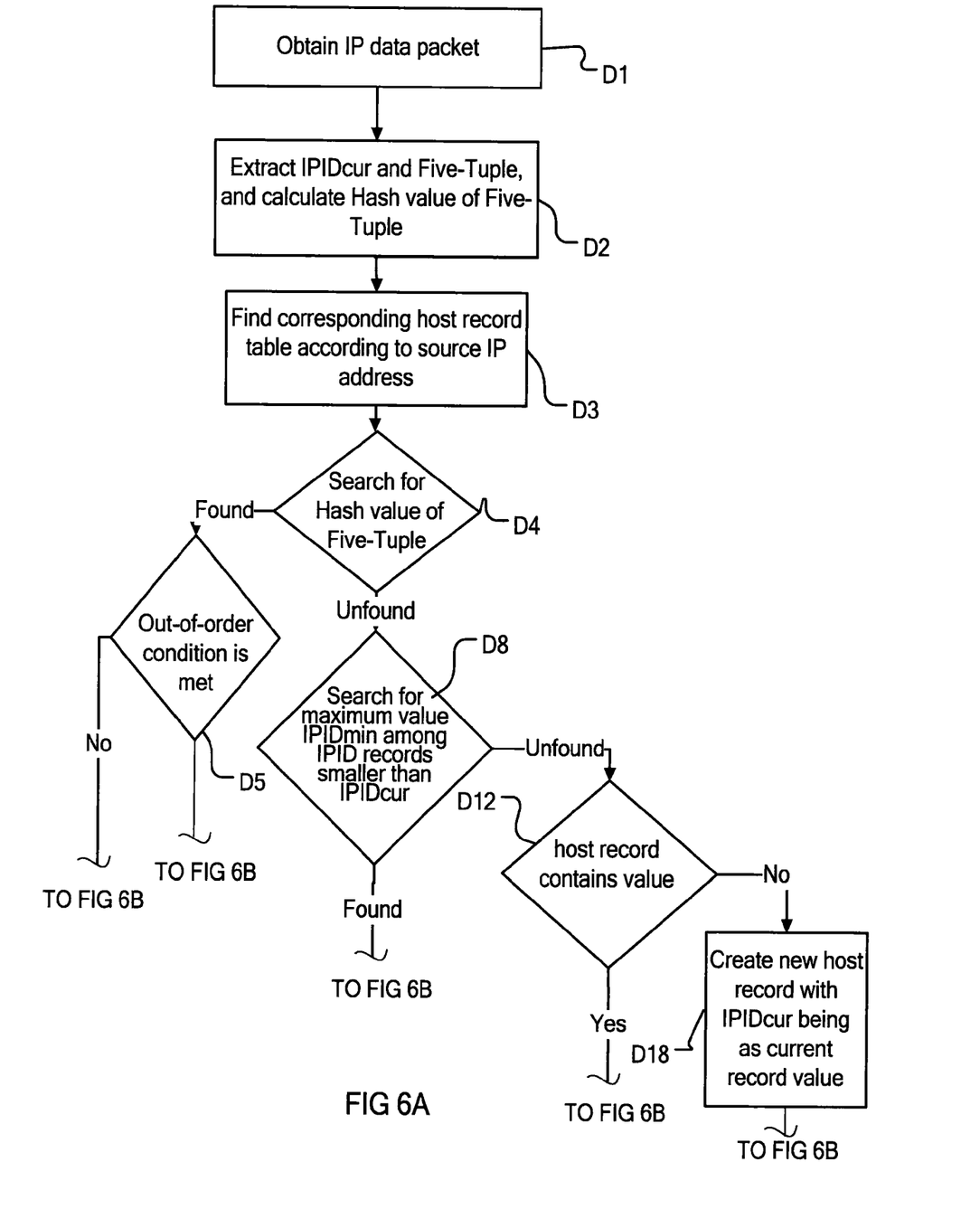
FIG. 6 is a flow chart illustrating statistics of the detecting method according to a third embodiment.
Figure 6B:
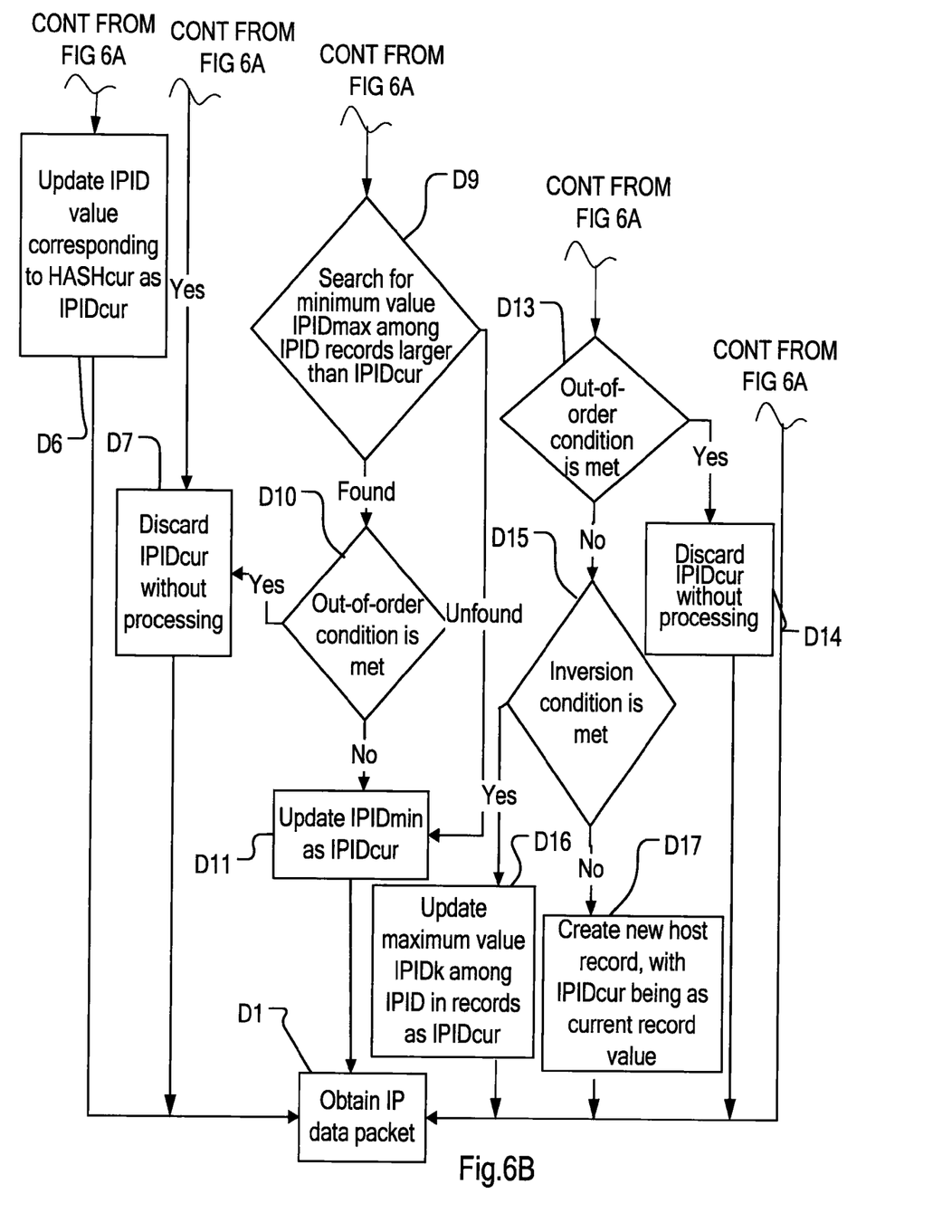

FIG. 6 is a flow chart illustrating statistics of the detecting method consistent with a third embodiment, in which flow chart the conditions such as data stream feature, out-of-order, inversion and the like are further taken into account.

Because the range of the IPID is from 0 to 65535, when the IPID is incremented to 65535, calculation may restart from 0. This is called inversion. As mentioned above, due to reasons such as network congestion, routing selection and the like, the data packet having a relatively larger IPID value may arrive earlier, and the data packet sent from the same host and having a relatively smaller IPID value may arrive later. This is called out-of-order. In some embodiments, the determination for the out-of-order may use a threshold method, i.e. occurrence of out-of-order may be determined if the difference between the current IPID value and the recorded IPID value is within a certain range. The determination for the inversion may also use a threshold method, i.e. 65535 is subtracted from the maximum IPID value among the current records, the subtracted value is added with the current IPID value, and occurrence of inversion may be determined if the obtained value is within a certain range.

FIG. 6 may include the following steps:

D1. The data forwarding apparatus receives an IP data packet of the monitored network and forwards it to the separating and filtering server.

D2. The separating and filtering server extracts the IPID field (denoted as IPIDcur) and the Five-Tuple, and calculates the Hash value (denoted as HASHcur) of the Five-Tuple.

The separating and filtering server transfers such information to the statistic and analyzing server. The Five-Tuple refers to the five fields identifying the data packet of a stream, i.e. the source IP address, the source port, the destination IP address, the destination port, and the type of the transport layer protocol. Here, the type of the transport layer protocol may be TCP/UDP.

D3. The statistic and analyzing server finds the corresponding host record table according to the source IP address.

The host record table is a series of Three-Tuple (host serial number, IPID, Hash value of Five-Tuple).

D4. The statistic and analyzing server searches in the host record table to determine whether the HASHcur can be found, execute step D5 if it is found, and execute step D8 otherwise.

D5. Determined whether the out-of-order condition is met, execute step D6 if not, and execute step D7 otherwise.

It is determined whether the received IPIDcur meets the out-of-order condition. The determination for the out-of-order condition may use a threshold method, i.e. occurrence of out-of-order may be determined if the difference between the IPIDcur and the adjacent IPID in the records which is larger than the IPIDcur is within a certain range.

D6. Update the IPID of the host corresponding to the HASHcur as the IPIDcur.

The HASHcur is found and the out-of-order condition is not met, which indicates that there is a record for the host, then update is performed directly.

D7. Discard the IPIDcur without processing.

D8. Search in the host record table to determine whether the host record table contains a maximum value IPIDmin among the IPID records smaller than the IPIDcur, execute step D9 if so, and execute step D12 otherwise.

Search for the maximum value IPIDmin (the $j^{th}$ record, where $j=1, 2 \ldots m$) among the IPID smaller than the IPIDcur.

D9. Search in the host record table to determine whether the host record table contains the minimum value IPIDmax among the IPID larger than the IPIDcur, execute step D11 if not, and execute step D10 otherwise.

Find the minimum value IPIDmax (the $i^{th}$ record, where $i=1, 2 \ldots m$) among the IPID larger than the IPIDcur in the existing Two-Tuple of host.

D10. Determine whether the out-of-order condition is met, execute step D7 if so, and execute step D11 otherwise.

Determine whether the received IPIDcur meets the out-of-order condition. The determination for the out-of-order condition may use a threshold method, i.e. occurrence of out-of-order may be determined if the difference between the IPIDcur and the IPIDmax is within a certain range.

D11. Update the maximum value IPIDmin among the IPID records smaller than the IPIDcur as the IPIDcur.

If there is no IPIDmax, i.e. the IPIDcur is maximum, the (j, IPIDmin, HASHj) is directly updated as (j, IPIDcur, HASHcur).

D12. Determine whether the host record contains an IPID value, execute step D13 if so, and execute step D18 otherwise.

If there is no IPIDmin, i.e. the IPIDcur is minimum, further determine whether the host record contains an IPID value.

D13. Determined whether the out-of-order condition is met, execute step D15 if not, and execute step D14 otherwise.

Determine whether the received IPIDcur meets the out-of-order condition. The determination for the out-of-order condition may use a threshold method, i.e. occurrence of out-of-order may be determined if the difference between the IPIDcur and the adjacent IPID in the records which is larger than the IPIDcur is within a certain range.

D14. Discard the IPIDcur without processing.

If the IPIDcur meets the out-of-order condition, no processing is carried out.

D15. Determine whether the inversion condition is met, execute step D17 if not, and execute step D16 otherwise.

Determine whether the received IPIDcur meets the inversion condition. The determination for the inversion condition may use a threshold method, i.e. 65535 is subtracted from the maximum IPID value among the current records, the subtracted value is added with the IPIDcur, and occurrence of inversion may be determined if the obtained value is within a certain range.

D16. Obtain the maximum IPIDk among the IPID in all the existing records and update it as the IPIDcur.

Obtain the maximum IPIDk (the $k^{th}$ record, and for $p=1, 2 \ldots m$, IPIDk>IPIDp) among the IPID in all the existing records, and update the (k, IPIDk, HASHk) as (k, IPIDcur, HASHcur).

D17. Create a new record (m+1, IPIDcur, HASHcur).

It is assumed that there are m IPIDs in all the existing Three-Tuple of host, and then a new record (m+1, IPIDcur, HASHcur) is created.

D18. Create a new record (1, IPIDcur, HASHcur).

The IPIDcur is compared with the IPID (e.g. m IPIDs) in all the existing Three-Tuple of host. Here m=0, and a new record (1, IPIDcur, HASHcur) is created.

Consistent with some embodiments, the two steps of determining out-of-order and inversion are not necessarily one after another. It should also be noted that in some embodiments, the stream feature is processed as an attribute, i.e. whether there is a record for the host is determined by calculating and searching for the HASHcur and the IPID value is updated directly if so. Practically, an algorithm consistent with some may be executed with the stream acting as an index, i.e. after being received, firstly the data is related to a particular stream, then corresponding processing is carried out in each particular stream according to the detection algorithm of the disclosed embodiments.

Consistent with some embodiments, the variation rule of the IPID in the WENT system is taken as an example. For the Window 98 system, the IPID is incremented sequentially by 256 instead of 1. In such a case, the disclosed embodiments may also be used where the two bytes of the IPID are processed in a lower-byte order manner and can thus be implemented in the same way as in the WINNT case, in that incrementing by 256 is equivalent to incrementing by 1 for the higher byte, with the lower byte being unchanged. Similarly, for those Linux and Unix systems, their IPID also vary regularly, and the disclosed embodiments may also be used.

The flow chart of reporting of the detecting method consistent with the third embodiment is illustrated in FIG. 5, and is not described in detail herein repeatedly.

Further, the detecting method consistent with some embodiments can deal with various abnormalities. For example, for the case where the IPID of two hosts differ from each other slightly, the disclosed embodiments may solve the problem well, in that even though the two hosts are close to each other, it may be unlikely that the IPID of the hosts may increase in turn all the time, and once the IPID value of one of the hosts falls behind slightly, it may be smaller than that of the current record. Thus, a new host record may be created, and therefore it may be detected out accurately. For the case of a sudden change, when the stream traffic within the inner network is too large, the IPID of the uplink data packet may change abruptly, but even there is a sudden change, the IPID is still in a trend of being incremented sequentially. Because the portion where the abrupt change occurs may not be updated in a short period of time, it may be updated when the IPID of another data packet is larger than it. Thus, the redundant determination may not arise.

The detecting method consistent with some embodiments is described in detail in the above. Correspondingly, other embodiments further provide a statistic and analyzing server and a detecting system.

Figure 7:
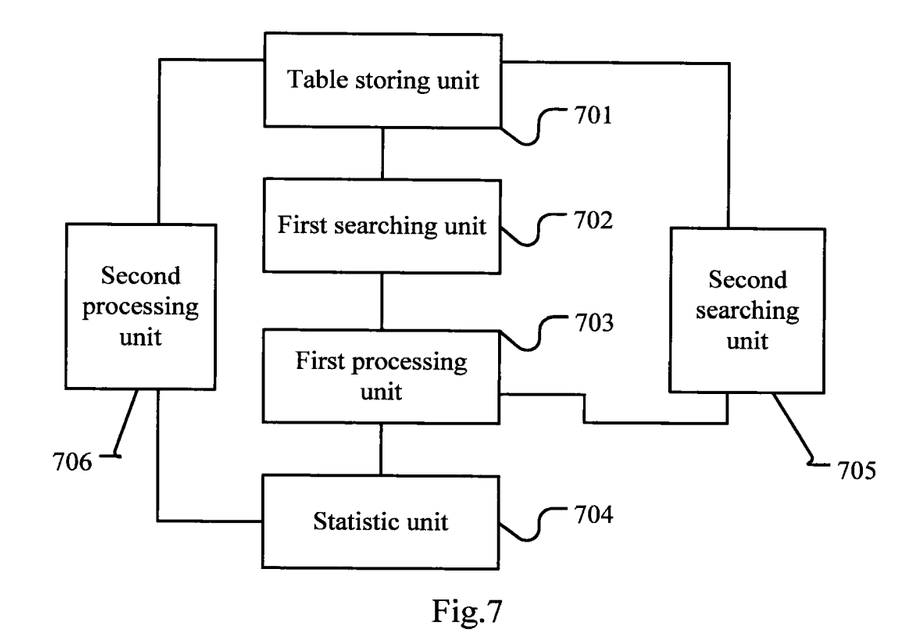
FIG. 7 is a schematic diagram illustrating a structure of the statistic and analyzing server consistent with some embodiments.

FIG. 7 is a schematic diagram illustrating a structure of the statistic and analyzing server consistent with some embodiments.

The statistic and analyzing server 700 may include a table storing unit 701, a first searching unit 702, a first processing unit 703, and a statistic unit 704.

The table storing unit 701 is configured to store a record table containing a correspondence relationship between an IPID value and a terminal serial number. The first searching unit 702 is configured to search in the record table stored in the table storing unit 701 to determine whether the record table contains an adjacent IPID value smaller than the extracted IPID value. The first processing unit 703 is configured to update the adjacent IPID value smaller than the extracted IPID value as the extracted IPID value if the first searching unit 702 determines that the record table contains the adjacent IPID value smaller than the extracted IPID value, and to add a new record of the extracted IPID value and the corresponding terminal serial number into the record table if the first searching unit 702 determines that the record table contains no adjacent IPID value smaller than the extracted IPID value. The statistic unit 704 is configured to calculate and output the number of terminal serial numbers in the record table, where the calculated number of terminal serial numbers in the record table namely refers to the number of access sharing hosts.

The statistic and analyzing server 700 further includes a second searching unit 705, configured to search in the record table stored in the table storing unit 701 to determine whether the record table contains an adjacent IPID value larger than the extracted IPID value, where the first processing unit 703 is configured to update the adjacent IPID value smaller than the extracted IPID value as the extracted IPID value if the second searching unit 705 determines that the record table contains no adjacent IPID value larger than the extracted IPID value, or if the second searching unit 705 determines that the record table contains the adjacent IPID value larger than the extracted IPID value but an out-of-order condition is not met, and to discard the extracted IPID value if the second searching unit 705 determines that the record table contains the adjacent IPID value larger than the extracted IPID value and the out-of-order condition is met.

The statistic and analyzing server 700 further includes a second processing unit 706. The record table stored in the table storing unit 701 further contains a correspondence relationship between a Hash value and the IPID value. The second processing unit 706 is configured to search in the record table to determine whether the record table contains the same Hash value according to the received Hash value, and to update the PIED value corresponding to the same Hash value as the extracted IPID value if so.

Figure 8:
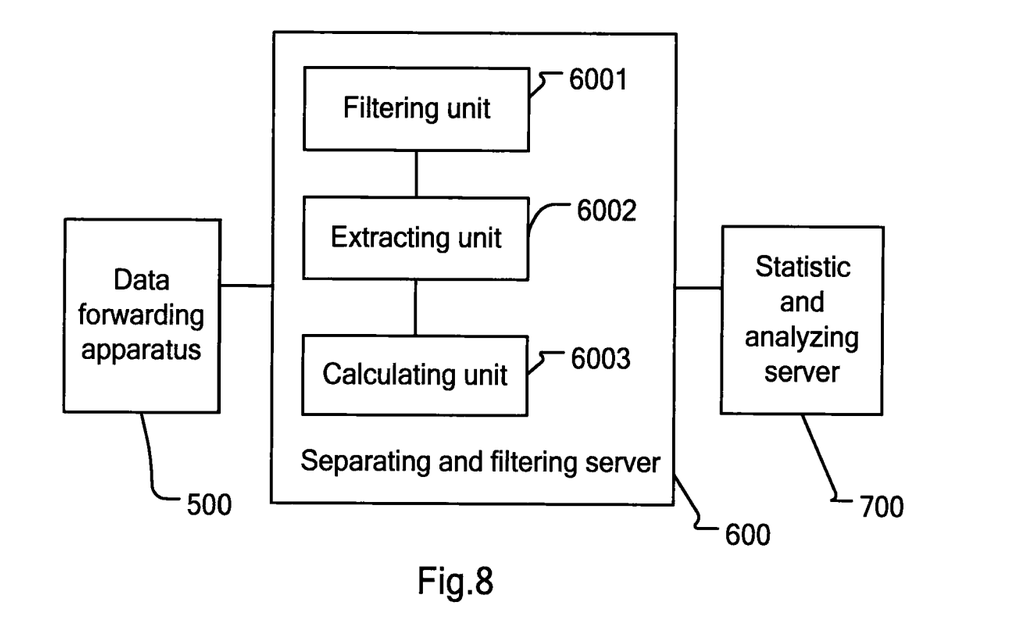
FIG. 8 is a schematic diagram illustrating a structure of a detecting system consistent with some embodiments.

FIG. 8 is a schematic diagram illustrating a structure of a detecting system consistent with some embodiments.

The detecting system may include a data forwarding apparatus 500, a separating and filtering server 600 and a statistic and analyzing server 700.

The data forwarding apparatus 500 is configured to obtain all network data accessing the network from the exit of the monitored group of hosts or the exit of the network, and to acquire and transfer the network data to the separating and filtering server 600 by using an independent broadband. The data forwarding apparatus 500 may be an optical splitter being arranged between the interface of the Metropolitan Area Network and the interface of the backbone network. The optical splitter is an existing network device being configured to import data of one network into another branch network. In some cases, the data forwarding apparatus 500 may alternatively be a mirror component for data mirroring in a switch supporting port data mirroring. A backup of the network data accessing the network via the exit can be obtained by using the mirror component.

The separating and filtering server 600 is configured to separate a data packet of a designated type from the network data transferred from the data forwarding apparatus 500, to extract useful data from the separated data packet, to report the data to the statistic and analyzing server, and to discard the data which is not of the designated type. Here, the data packet of the designated type may be the IP data packet, mainly including the TCP data packet and the UDP data packet. The extracted useful data mainly includes the IPID filed, the Five-Tuple and other feature fields.

The separating and filtering server 600 further includes a filtering unit 6001, an extracting unit 6002 and a calculating unit 6003.

The filtering unit 6001 is configured to separate the data packet of the designated type from the received data packet.

The extracting unit 6002 is configured to extract the IPID value and a Five-Tuple from the data packet separated out by the filtering unit 6001.

The calculating unit 6003 is configured to calculate a Hash value according to the Five-Tuple and to transmit the Hash value to the statistic and analyzing server.

The statistic and analyzing server 700 is configured to search in a record table containing a correspondence relationship between the IPID value and a terminal serial number to determine whether the record table contains an adjacent IPID value smaller than the extracted IPID value, and to update the adjacent IPID value smaller than the extracted IPID value as the extracted IPID value if so, and to add a new record of the extracted IPID value and the corresponding terminal serial number into the record table otherwise. The statistic and analyzing server is configured to search in the record table to determine whether the record table contains the same Hash value according to the received Hash value, and to update the IPID value corresponding to the same Hash value as the extracted IPID value if so.

The statistic and analyzing server 700 is configured to calculate the number of terminal serial numbers in the record table within a preset period of time, and to report the calculation result when a reporting condition is triggered. The calculated number of terminal serial numbers in the record table namely refers to the number of access sharing hosts. The reporting condition may adopt a time-triggered mechanism, or alternatively may adopt a packet-triggered mechanism where after a certain period of time, only if update is performed upon reception of a particular data packet, can the record be reported. Furthermore, the stream aging mechanism may also be used to further improve the accuracy.

The separating and filtering server 600 and the statistic and analyzing server 700 may be the same server, or alternatively may be servers independent from each other.

In summary, the disclosed embodiments may include methods and systems for extracting an IPID value from an obtained data packet; searching in a record table containing a correspondence relationship between the IPID value and a terminal serial number to determine whether the record table contains an adjacent IPID value smaller than the extracted IPID value, updating the adjacent IPID value smaller than the extracted IPID value as the extracted IPID value if so, and adding a new record of the extracted IPID value and the corresponding terminal serial number into the record table otherwise; and calculating the number of terminal serial numbers in the record table and outputting the same as the number of hosts. Because the disclosed embodiments make use of the variation rule of the IPID, the hosts can be sequentially separated out with the descending IPID according to an algorithm similar, but not limited to, the Bubble-Sort. Thus, the number of access sharing hosts can be determined more accurately.

Further, the detecting method consistent with some embodiments deal with various abnormalities. For example, for the case that the IPID of two hosts differ from each other slightly, even the two hosts are close to each other, it is unlikely that the IPID of the hosts may increase in turn all the time, and once the IPID value of one of the hosts falls behind slightly, it may be smaller than that of the current record. Thus, a new host record may be created, and therefore it may be detected out accurately. For the case of a sudden change, when the stream traffic within the inner network is too large, the IPID of the uplink data packet may change abruptly, but even if there is a sudden change, the IPID is still in a trend of being incremented sequentially. Because the portion where the abrupt change occurs may not be updated in a short period of time, it may be updated when the IPID of another data packet is larger than it. Thus, the redundant determination may not arise.

The detecting method, the statistic and analyzing server and the detecting system according consistent with some embodiments are described in detail in the above. The principle and implementation of the embodiments are set forth herein by way of specific examples. The above description of the embodiments is merely used to facilitate understanding the disclosure. Based on the disclosed embodiments, those ordinarily skilled in the art may devise variations and equivalents for the embodiments and the scope of the disclosure. Consequently, the scope of the disclosure is not limited to the disclosed embodiments contained herein.

What is claimed is:

1. A method for detecting a host included in a network, comprising:
   extracting an Internet Protocol Identifier value IPID1 from an obtained data packet;
   searching in a record table containing a correspondence relationship between an Internet Protocol Identifier value and a terminal serial number to determine whether the record table contains an adjacent Internet Protocol Identifier value IPID2 smaller than the extracted Internet Protocol Identifier value IPID1;
   modifying the adjacent Internet Protocol Identifier value IPID2 to be the Internet Protocol Identifier value IPID1 if the record table contains the adjacent Internet Protocol Identifier value IPID2 that is smaller than the extracted Internet Protocol Identifier value IPID1;
   adding a new record of the Internet Protocol Identifier value IPID1 and the corresponding terminal serial number into the record table otherwise; and
   calculating a number of terminal serial numbers in the record table and outputting the number of terminal serial numbers as a number of hosts.

2. The method according to claim 1, further comprising:
   searching in the record table to determine whether the record table contains an adjacent Internet Protocol Identifier value IPID3 larger than the Internet Protocol Identifier value IPID1;
   determining whether an IPID out-of-order occurs if the record table contains the adjacent Internet Protocol Identifier value IPID3 larger than the Internet Protocol Identifier value IPID1; and
   modifying the adjacent Internet Protocol Identifier value IPID2 to be the Internet Protocol Identifier value IPID1 if the IPID out-of-order does not occur.

3. The method according to claim 1, further comprising:
   when it is determined that the record table contains no adjacent Internet Protocol Identifier value smaller than the Internet Protocol Identifier value IPID1, adding the Internet Protocol Identifier value IPID1 and the corresponding terminal serial number into the record table if the record table contains an Internet Protocol Identifier value and neither an out-of-order condition nor an inversion condition is met.

4. The method according to claim 3, further comprising:
   modifying a maximum Internet Protocol Identifier value in the record table to be the Internet Protocol Identifier value IPID1 if the record table contains the Internet Protocol Identifier value and the out-of-order condition is not met but the inversion condition is met.

5. The method according to claim 1, wherein
   the record table further contains a correspondence relationship between a Hash value and the Internet Protocol Identifier value; and
   before searching for the Internet Protocol Identifier value IPID2, the method further comprises:
   calculating the Hash value from a Five-Tuple extracted from the obtained data packet;
   searching in the record table to determine whether the record table contains the same Hash value;
   modifying the Internet Protocol Identifier value corresponding to be the same Hash value as the Internet Protocol Identifier value IPID1 if the record table contains the same Hash value; and
   continuing to search in the record table to determine whether the record table contains the adjacent Internet Protocol Identifier value smaller than the IPID1 otherwise.

6. The method according to claim 5, wherein after it is determined that the record table contains the same Hash value by searching in the record table, the method further comprises:
   modifying the Internet Protocol Identifier value corresponding to be the same Hash value as the Internet Protocol Identifier value IPID1 if it is determined that an out-of-order condition is not met.

7. A statistic and analyzing server, characterized by comprising:
- a table storing unit, configured to store a record table containing a correspondence relationship between an Internet Protocol Identifier value and a terminal serial number;
- a first searching unit, configured to search in the record table stored in the table storing unit to determine whether the record table contains an adjacent Internet Protocol Identifier value smaller than an Internet Protocol Identifier value IPID1 extracted from an obtained data packet;
- a first processing unit, configured to modify the adjacent Internet Protocol Identifier value smaller than the extracted Internet Protocol Identifier value IPID1 as the Internet Protocol Identifier value IPID1 if the first searching unit determines that the record table contains the adjacent Internet Protocol Identifier value smaller than the IPID1, and to add a new record of the IPID1 and a corresponding terminal serial number into the record table if the first searching unit determines that the record table contains no adjacent Internet Protocol Identifier value smaller than the Internet Protocol Identifier value IPID1; and
- a statistic unit configured to calculate a number of terminal serial numbers in the record table and to output the number of terminal serial numbers as a number of hosts.

8. The statistic and analyzing server according to claim 7, further comprising:
- a second searching unit configured to search in the record table stored in the table storing unit to determine whether the record table contains an adjacent Internet Protocol Identifier value larger than the Internet Protocol Identifier value IPID1, wherein
- the first processing unit is configured to modify the Internet Protocol Identifier value smaller than the Internet Protocol Identifier value IPID1 as the Internet Protocol Identifier value IPID1 in at least one of following conditions: if the second searching unit determines that the record table contains no adjacent Internet Protocol Identifier value larger than the Internet Protocol Identifier value IPID1, and if the second searching unit determines that the record table contains the adjacent Internet Protocol Identifier value larger than the Internet Protocol Identifier value IPID1 but an out-of-order condition is not met; and to discard the Internet Protocol Identifier value IPID1 if the second searching unit determines that the record table contains the adjacent Internet Protocol Identifier value larger than the Internet Protocol Identifier value IPID1 and the out-of-order condition is met.

9. The statistic and analyzing server according to claim 8, further comprising a second processing unit, wherein the record table stored in the table storing unit further includes a correspondence relationship between a Hash value and the Internet Protocol Identifier value, and the second processing unit is configured to search in the record table to determine whether the record table contains the same Hash value according to the received Hash value, and to modify the Internet Protocol Identifier value corresponding to the same Hash value as the extracted Internet Protocol Identifier value if the record table contains the same Hash value.

10. The statistic and analyzing server according to claim 7, further comprising a second processing unit, wherein the record table stored in the table storing unit further includes a correspondence relationship between a Hash value and the Internet Protocol Identifier value, and the second processing unit is configured to search in the record table to determine whether the record table contains the same Hash value according to the received Hash value, and to modify the Internet Protocol Identifier value corresponding to the same Hash value as the extracted Internet Protocol Identifier value if the record table contains the same Hash value.

11. A detecting system, comprising:
- a separating and filtering server, configured to separate a data packet of a designated type from the received data packet, and to extract an Internet Protocol Identifier value IPID4 from the separated data packet; and
- a statistic and analyzing server, configured to search in a record table containing a correspondence relationship between an Internet Protocol Identifier value and a terminal serial number to determine whether the record table contains an adjacent Internet Protocol Identifier value smaller than the Internet Protocol Identifier value IPID4, to modify the adjacent Internet Protocol Identifier value smaller than the Internet Protocol Identifier value IPID4 as the Internet Protocol Identifier value IPID4 if the record table contains the adjacent Internet Protocol Identifier value smaller than the Internet Protocol Identifier value IPID4, to add a new record of the Internet Protocol Identifier value IPID4 and the corresponding terminal serial number into the record table otherwise, and to calculate the number of terminal serial numbers in the record table and to output the number of terminal serial numbers as a number of hosts.

12. The detecting system according to claim 11, wherein the separating and filtering server further comprises:
- a filtering unit, configured to separate the data packet of the designated type from the received data packet;
- an extracting unit, configured to extract the Internet Protocol Identifier value and a Five-Tuple from the data packet separated out by the filtering unit; and
- a calculating unit, configured to calculate a Hash value according to the Five-Tuple and to transmit the Hash value to the statistic and analyzing server, wherein
- the statistic and analyzing server is further configured to search in the record table to determine whether the record table contains the same Hash value according to the received Hash value, and to modify the Internet Protocol Identifier value corresponding to the same Hash value as the extracted Internet Protocol Identifier value if the record table contains the same Hash value.

* * * * *